(12) United States Patent
Cooper

(10) Patent No.: US 7,767,294 B2
(45) Date of Patent: Aug. 3, 2010

(54) PRIMER COATING FOR ENHANCING ADHESION OF LIQUID TONER TO POLYMERIC SUBSTRATES

(75) Inventor: Robin Cooper, Belgium (GB)

(73) Assignee: Michelman, Inc., Cincinnati, OH (US)

( * ) Notice: Subject to any disclaimer, the term of this patent is extended or adjusted under 35 U.S.C. 154(b) by 0 days.

(21) Appl. No.: 12/267,629

(22) Filed: Nov. 10, 2008

(65) Prior Publication Data

US 2009/0061235 A1 Mar. 5, 2009

Related U.S. Application Data

(62) Division of application No. 11/118,660, filed on Apr. 29, 2005, now Pat. No. 7,470,736.

(60) Provisional application No. 60/567,625, filed on May 3, 2004.

(51) Int. Cl.
  *B32B 27/08* (2006.01)
  *B32B 27/30* (2006.01)
  *B32B 27/32* (2006.01)
  *B32B 27/34* (2006.01)
  *B32B 27/36* (2006.01)
  *B32B 27/40* (2006.01)

(52) U.S. Cl. .................. 428/336; 428/423.5; 428/423.7; 428/424.6; 428/424.8; 428/475.8; 428/476.3; 428/483; 428/518; 428/520; 428/910

(58) Field of Classification Search ................ 428/336, 428/423.5, 423.7, 424.6, 424.8, 475.8, 476.3, 428/483, 518, 520
See application file for complete search history.

(56) References Cited

U.S. PATENT DOCUMENTS

| 5,225,306 A | 7/1993 | Almog et al. |
| 5,276,492 A | 1/1994 | Landa et al. |
| 5,346,796 A | 9/1994 | Almog |
| 5,407,771 A | 4/1995 | Landa et al. |
| 5,776,604 A | 7/1998 | Lu et al. |
| 5,789,123 A | 8/1998 | Cleckner et al. |
| 5,827,627 A | 10/1998 | Cleckner et al. |
| 5,969,025 A | 10/1999 | Corzani |
| 5,998,038 A | 12/1999 | Shibatani et al. |
| 6,114,021 A | 9/2000 | Pankratz et al. |
| 6,379,787 B1 | 4/2002 | Lu |
| 6,723,773 B2 | 4/2004 | Williams et al. |
| 2002/0058194 A1 * | 5/2002 | Williams et al. ............ 430/138 |
| 2007/0172609 A1 | 7/2007 | Williams |

FOREIGN PATENT DOCUMENTS

| EP | 0789281 A2 | 8/1997 |
| EP | 1273975 | 1/2003 |
| WO | WO9623659 A1 | 8/1996 |
| WO | WO03029015 A2 | 4/2003 |

* cited by examiner

*Primary Examiner*—D. S. Nakarani
(74) *Attorney, Agent, or Firm*—Dinsmore & Shohl LLP

(57) ABSTRACT

A primer coating is provided for use on polymeric substrates to enhance adhesion of liquid toner to the substrates for printing in an electrophotographic printing device. The primer coating is water-based and includes a dispersion of a copolymer of ethylene and acrylic or methacrylic acid, and a compatible adhesion enhancer selected from an aliphatic polyurethane dispersion, a hydrogenated hydrocarbon rosin or rosin ester dispersion, and an amorphous acrylic polymer dispersion. The coating may also include additives such as wetting agents, antiblocking agents, matting agents, and waxes. The primer coating may be applied to a variety of polymeric substrates including polypropylene, biaxially oriented polpypropylene, polyethylene terephthalate, and polyvinyl chloride.

4 Claims, No Drawings

PRIMER COATING FOR ENHANCING ADHESION OF LIQUID TONER TO POLYMERIC SUBSTRATES

CROSS REFERENCE TO RELATED APPLICATIONS

This application is a divisional of U.S. patent application Ser. No. 11/118,660, entitled PRIMER COATING FOR ENHANCING ADHESION OF LIQUID TONER TO POLYMERIC SUBSTRATES, filed Apr. 29, 2005, which claims the benefit of U.S. Provisional Application No. 60/567,625, entitled PRIMER COATING FOR ENHANCING ADHESION OF LIQUID TONER TO POLYMERIC SUBSTRATES, filed May 3, 2004. The entire contents of said applications are hereby incorporated by reference.

BACKGROUND OF THE INVENTION

This invention relates to a primer coating for use on polymeric substrates, and more particularly, to a primer coating for enhancing the adhesion of liquid toner to polymeric films which are designed to be printed using an electrophotographic printing device.

In recent years, the use of on-demand digital printing machines utilizing liquid electrophotographic systems has become widespread. In such systems, liquid toner images are formed on a photosensitive drum and then electrically transferred onto an intermediate transfer blanket or belt for printing on a paper or polymeric film sheet or web. An example of a liquid toner for use in electrostatic printers is described in U.S. Pat. No. 5,407,771, and printers using such liquid toner are commercially available from Hewlett-Packard Company under the trade name HP Indigo. Polymeric films are often preferred for use over paper in electrostatic imaging because they are moisture resistant, flexible, and can be clear or opaque. However, liquid toners do not transfer well and/or adhere well to such films or paper substrates unless they have been treated with a coating or primer (also referred to as "optimized") to enhanced the adhesion of liquid toners. A number of coatings or primers have been developed for use on substrates such as polymeric films which render the surface of the films more receptive to liquid toners. For example, a polyamide resin in solution is known for use on such polymeric films. However, because the polyamide is dissolved in a solvent, this can lead to environmental problems when the solvent is evaporated. In addition, the solution is difficult to handle at low temperatures, as the polyamide tends to lose solubility. The coating also has a limited shelf life in storage prior to printing.

Other coatings have been developed based on ethylene-acrylic acid copolymers. As described in U.S. Pat. No. 5,789,123, an ethylene-acrylic acid copolymer based coating is used to enhance the adhesion of liquid toner to polymeric substrates such as biaxially oriented polypropylene, polyethylene terephthalate and polyvinyl chloride. However, the ethylene-acrylic acid copolymer based coating must be used in conjunction with an additional precoating which is required to form the bond between the coating and polymeric substrate.

Accordingly, there is still a need in the art for a primer coating which provides good liquid toner adhesion to a variety of polymeric substrates without the need for the application of additional precoatings, is stable and easy to handle over a wide range of temperatures, and which has an extended shelf life.

SUMMARY OF THE INVENTION

Embodiments of the present invention meet those needs by providing a primer coating for use on a wide variety of polymeric substrates such as polypropylene, biaxially oriented polypropylene (BOPP), polyethylene terephthalate, polyamide, biaxially oriented polyamide, and polyvinyl chloride. The coating provides enhanced liquid toner adhesion to such polymeric substrates, especially those which are printed using electrophotographic printing devices without the need for an additional precoating.

According to one aspect of the present invention, a primer coating for enhancing adhesion of liquid toner to a polymeric substrate is provided. The primer coating comprises a mixture of a dispersion of a copolymer of ethylene and acrylic or methacrylic acid; and a compatible adhesion enhancer selected from the group consisting of an aliphatic polyurethane emulsion, a hydrogenated hydrocarbon rosin or rosin ester emulsion, and an amorphous acrylic polymer emulsion. By "adhesion enhancer," it is meant that the component enhances adhesion of the coating to the substrate to which it is applied.

The primer coating preferably further includes a wetting agent which is preferably selected from the group consisting of alcohols and surfactants. The primer coating also preferably includes a matting agent. The matting agent may comprise, for example, amorphous silica.

The primer coating also preferably includes an antiblocking agent selected from the group consisting of crosslinking agents, waxes, silica, metal hydroxides, and mixtures thereof. Where the antiblocking agent comprises a metal hydroxide, the coating preferably includes from about 0.05 to about 1.0% by weight of the metal hydroxide. Where the antiblocking agent is a crosslinking agent, the coating preferably includes from about 0.05 to 5% by weight of the crosslinking agent. A preferred crosslinking agent is a melamine formaldehyde resin.

Where the antiblocking agent comprises a wax, the coating preferably includes from about 4 to 15% by weight of the wax.

Preferably, the primer coating comprises from about 60 to 95% by weight of the copolymer dispersion. Typically, the dispersion contains 35% total solids. Where the adhesion enhancer comprises an aliphatic polyurethane dispersion, the coating preferably comprises from about 5 to 40% of the dispersion, which contains 33% total solids. Where the adhesion enhancer comprises a hydrogenated hydrocarbon rosin or rosin ester dispersion, the coating preferably comprises from about 10 to 40% by weight of the hydrogenated hydrocarbon rosin or rosin ester dispersion based on a 55% total solids content. Where the toner adhesion enhancer comprises an amorphous acrylic polymer dispersion, the coating preferably comprises from about 5 to 40% by weight of the amorphous acrylic polymer dispersion based on a 35% total solids content.

The primer coating is preferably applied to a polymeric substrate by applying the coating to at least one major surface of the substrate and then preferably drying the coating. Preferably, the polymeric substrate is selected from polypropylene, biaxially oriented polypropylene, cast polypropylene, polyethylene terephthalate, polyamide, biaxially oriented polyamide, and polyvinyl chloride.

In one embodiment, the method of applying the primer coating includes treating at least one major surface of the substrate by a flame treatment or corona discharge treatment prior to applying the primer coating.

Typically, the primer coating is applied to the polymeric substrate such that, when dried, it forms a coating having a thickness of from about 0.1 to about 2 microns, and more preferably, from about 0.3 to about 0.5 microns. The coated substrate may then be printed by applying liquid toner from a digital printing apparatus to the coated surface of the polymeric substrate without the need for additional precoatings.

Accordingly, it is a feature of the present invention to provide a primer coating and a method of applying the coating to polymeric substrates which provides enhanced toner adhesion to the coated polymeric substrates when printed with liquid toner inks using electrophotographic printing devices. This, and other features and advantages of the present invention will become apparent from the following detailed description.

DETAILED DESCRIPTION OF THE PREFERRED EMBODIMENT

The primer coating of the present invention provides a number of advantages over prior coatings in that it provides enhanced liquid toner adhesion to a number of different polymeric substrates. In addition, the coating does not require the use of any additional primers or precoatings to achieve proper adhesion, and avoids the problems of solvent-based coatings because it comprises a water-based composition.

The primer coating is based on a dispersion of a copolymer of ethylene and acrylic acid or methacrylic acid, which ensures good transfer of the ink image to the substrate. The copolymer exhibits good adhesion to ethylenic polymers as such polymers are typically the binders used in liquid toner compositions. The copolymer should have a sufficient degree of hot tack to ensure that, during printing, the image is removed from the printing blanket under normal operating temperatures (120° C. to 140° C.) when the image is brought into contact with the substrate. Preferably, the copolymer comprises from about 65 to 95 wt % ethylene and from about 5 to 35 wt % acrylic or methacrylic acid. The copolymer may have a number average molecular weight of about 2,000 to 50,000. The copolymer is preferably prepared as a dispersion by heating the solid polymer with a water phase in a pressure reactor in the presence of a base such as ammonia or an alkali such that the base reacts with the acid groups on the polymer, and upon melting, the polymer forms a colloidal dispersion. The primer coating contains from about 60 to 95 wt % of the dispersion containing 35% total solids. A suitable ethylene acrylic acid dispersion for use in the present invention is commercially available from Michelman under the designation Michem®Prime 4990R.E.

While ethylene-acrylic or methacrylic acid copolymers exhibit good ink transferability, generally they do not have sufficient adhesion to nonpolar polymeric substrates such as polypropylene or polyethylene terephthalate. Accordingly, the primer coating further includes an adhesion enhancer which is compatible with the ethylene-acrylic or methacrylic acid copolymer dispersion and which increases adhesion to the underlying substrate without adversely affecting the transfer of the ink image to the substrate. The adhesion enhancer is preferably in the form of a dispersion comprising either a polyurethane, a hydrogenated hydrocarbon rosin or rosin ester, or an amorphous acrylic polymer. Where the coating includes a polyurethane dispersion, the coating preferably includes from about 5 to 40 wt % of the dispersion which contains 33% total solids. A suitable polyurethane dispersion is commercially available from NeoResins under the designation NeoRez® R-600. Other suitable polyurethane dispersions include Incorez 217 from Industrial Copolymer Ltd. and TD7037 or TD7038 from Scott Bader Company Ltd.

Where the toner adhesion enhancer comprises a hydrocarbon rosin or rosin ester dispersion, the coating includes from about 10 to 40 wt % of the dispersion which contains 55% solids. Preferably, a hydrogenated hydrocarbon rosin or rosin ester having a ring and ball softening point in the range of from about 70° C. to 105° C. is used. The rosin or rosin ester dispersion is preferably formed by melting the rosin or rosin ester and then dispersing the polymer in a water phase using surfactants and agitation. A suitable hydrocarbon resin dispersion is commercially available from Eastman Chemical Resins Inc. under the designation Tacolyn 1100. Other suitable hydrocarbon resin dispersions include Tacolyn 3166 and Tacolyn 4187, also available from Eastman Chemical Resins Inc.

Where the toner adhesion enhancer comprises an amorphous acrylic polymer dispersion, the coating may include from about 5 to 40% of the dispersion which contains 35% solids. The dispersion is preferably prepared by dissolving amorphous acrylic polymers in water at elevated temperatures in the presence of ammonia or bases. A suitable amorphous acrylic emulsion is Neocryl BT36 from Neo Resins.

The primer coating of the present invention preferably further contains a wetting agent for reducing the surface tension of the coating to wet out the substrate and to promote flow or leveling of the coating prior to drying. Suitable wetting agents include surfactants and alcohols, such as isopropyl alcohol. Preferred surfactants include nonionic acetylinic glycol-based surfactants such as Dynol™ 604 from Air Products. Other suitable surfactants include polyalkylene oxide modified polymethylsiloxanes such as Silwet® L-77 from GE Advanced Materials.

Other optional additives which may be included in the primer coating are matting agents such as amorphous silica, which maintains a matte print surface. Such additives may be present in an amount of from about 2 to 4 wt %. A preferred amorphous silica is Ace-Matt TS100, available from Degussa. If the substrate used is glossy, higher amounts of silica (up to about 15% by weight) may be used to achieve a matte print surface.

Because the primer coating exhibits a high hot tack, it is desirable to add one or more antiblocking agents to the coating to reduce residual tack when the substrate is rewound after coating and during storage. The antiblocking agents should not interfere with hot tack development and transfer of the ink image to the substrate. Preferred antiblocking agents include crosslinking agents, waxes, silica, metal hydroxides, and mixtures thereof. A preferred crosslinking agent is melamine formaldehyde resin, which may be present in an amount of from about 0.05 to 5 wt %. Other suitable crosslinking agents include sodium hydroxide, potassium hydroxide, zinc oxide, and polyethylene imine (Aziridine).

Suitable waxes include carnauba wax, oxidized polyethylene wax, and montan wax. Preferred for use is a 25% solids carnauba wax emulsion available from Michelman, Inc. under the designation Michem® Lube 160. The wax is preferably included in an amount of from about 4 to 15% by weight of the total dispersion.

Where metal hydroxides are added to the formulation as antiblocking agents, they are incorporated as metal ions to form a partial ionomerization of the ethylene-acrylic or methacrylic copolymer. The metal ions may be selected from Group IA, IIA, or IIB of the periodic table. Preferred for use are sodium or potassium ions in the form of their hydroxides. The hydroxides are included in amount of from about 0.05 to 1% by weight. When such metal hydroxides are used, the primer coating is preferably made by forming two ethylene acrylic acid dispersions; e.g., an ammonia dispersion based on MichemPrime 4990R.E. and a sodium dispersion based on the same ethylene acrylic acid.

The two dispersions are preferably blended in a ratio of 40 to 100 parts of the ammonia-based dispersion and 0 to 60 parts of the sodium based dispersion along with the remaining components.

Water (preferably soft water) may also be added to the primer coating to lower the viscosity of the coating and aid in the flow of the coating. The coating may contain from 0 to 30 wt % of soft water.

Before the primer coating is applied to a polymeric substrate, the surface of the substrate is preferably treated to ensure that the coating will wet out the surface of the film. The film is
preferably treated using conventional techniques such as a flame treatment or a high voltage corona discharge treatment.

The primer coating is applied to the polymeric substrate in any suitable manner including gravure coating, roll coating, wire rod coating, flexographic printing, spray coating and the like. The coating composition is preferably applied such that upon drying, the coating forms a smooth, evenly distributed layer of about 0.1 to 2 microns in thickness, and more preferably, from about 0.3 to 0.5 microns in thickness, which imparts the desired printability and adhesion properties to the liquid toner ink and the substrate. After the coating is applied, it may be dried by hot air, radiant heat, or any other suitable means which provides a clear, adherent coated film.

In order that the invention may be more readily understood, reference is made to the following examples, which are intended to illustrate the invention, but are not to be taken as limiting the scope thereof.

Example 1

Several primer coating compositions were prepared in accordance with embodiments of the present invention by mixing the components listed below.

| Component | Wt. % of total composition |
|---|---|
| Formulation 1 | |
| ethylene-acrylic copolymer dispersion[1] | 53.7 |
| hydrocarbon rosin ester dispersion[2] | 23.3 |
| isopropyl alcohol | 15.4 |
| soft water | 7.6 |
| Formulation 2 | |
| ethylene-acrylic copolymer dispersion[1] | 90 |
| water-based polyurethane dispersion[3] | 10 |
| Formulation 3 | |
| ethylene-acrylic copolymer dispersion[1] | 80 |
| water-based polyurethane dispersion[3] | 20 |
| Comparative Formulation 4 | |
| ethylene-acrylic copolymer dispersion[1] | 33.5 |
| isopropyl alcohol | 20.0 |
| soft water | 46.5 |
| Formulation 5 | |
| ethylene-acrylic copolymer dispersion[1] | 76.5 |
| water-based polyurethane dispersion[3] | 19.1 |
| soft water | 4.0 |
| surfactant[4] | 0.4 |

-continued

| Component | Wt. % of total composition |
|---|---|
| Formulation 6 | |
| ethylene-acrylic copolymer dispersion[1] | 63.75 |
| water-based polyurethane dispersion[3] | 15.9 |
| soft water | 20.05 |
| surfactant[5] | 0.3 |
| Formulation 7 | |
| ethylene-acrylic copolymer dispersion[1] | 73.4 |
| water-based polyurethane dispersion[3] | 18.4 |
| soft water | 3.82 |
| surfactant[4] | 0.38 |
| wax[6] | 4.0 |
| Formulation 8 | |
| ethylene-acrylic copolymer dispersion[1] | 46.7 |
| sodium stabilized ethylene-acrylic acid dispersion[7] | 36.7 |
| water-based polyurethane dispersion[3] | 16.6 |

[1]MP4990R.E from Michelman
[2]Tacolyn 1100 from Eastman Chemical Resins Inc.
[3]Neo Rez R-600 from Neo Resins
[4]Dynol 604 from Air Products
[5]Silwet 77 from Setre Chemical
[6]Carnauba Wax emulsion ML 160 from Michelman, Inc.
[7]sodium dispersion based on MP 4990R.E. (20% solids content)

Formulations 1-4 were coated onto a polyethylene terephthalate (PET) film having a surface energy of greater than 53 dynes/cm using a rod coater and applying 4 microns of wet coating. The coatings were dried using hot air at approximately 100° C. All four coated substrates were then printed on a Hewlett-Packard Indigo sheet fed printer using liquid toner ink and tested for adhesion of primer to the substrate as well as for the adhesion of toner ink to the primer. The adhesion test was performed after 15 minutes and after 24 hours by applying adhesive tape in accordance with ISO 2409 and removing the tape after 30 minutes. If any film (primer coating) or toner removal occurred, the test was recorded as a failure; no removal of the toner or coating indicated a pass.

The comparative formulation 4 is the only formulation which failed. In all other formulations, total adhesion of the film to the primer coating and total adhesion of the toner to the coating was achieved. The results demonstrate that an ethylene-acrylic copolymer dispersion alone, even when used in conjunction with a wetting agent and a high surface energy film, does not achieve sufficient toner adhesion when compared to formulations of embodiments of the present invention.

Example 2

Formulations 1, 2, and 3 above were applied to corona discharge treated biaxially oriented polypropylene film (having a surface energy of greater than 40 dynes/cm) using the application method described in Example 1. All four coated substrates were printed on a Hewlett-Packard Indigo series 1000 sheet fed printer and tested for adhesion after 15 minutes and 24 hours. All three printed samples passed the adhesive tape test as described above. In a separate test, Comparative Formulation 4 showed adhesive failure to the OPP film when applied under the same conditions.

Example 3

Formulation 1 was applied to an opaque polypropylene synthetic paper (obtained from YUPO Corporation) using a flexographic roll coater at a coat weight of 0.7 gm/m². The coating was dried in-line using infra-red heaters and then re-wound. The coated reels were then slit and sheeted. The sheets were printed using a Hewlett-Packard HP Indigo series 1000 sheet fed printer. The printed samples passed the adhesive tape test as described above.

Example 4

Formulation 5 was applied to YUPO opaque polypropylene synthetic paper under the same conditions as in Example 3 and sheets were printed using a Hewlett-Packard Indigo series 1000 sheet fed printer. The printed samples passed the adhesive tape test as described above.

Example 5

Formulation 6 was applied using a rod coater onto transparent reels of OPP and PET film that had been corona treated in-line with the coating application. The coating was dried using air flotation dryers at a temperature of 70° C. and cooled using a chill roller before rewinding. Tape adhesion tests as described above were carried out on the coated products which passed. The coated products were then printed on a web fed Hewlett-Packard Indigo web fed printer. Adhesion was tested both immediately and after 24 hours using the tape adhesion test. The printed and coated products passed.

substrate and the compatibility of the coated substrate to toner, specifically highlight dots, thin lines, and areas of high coverage. A repeated pattern of 5 different print tests are run for approximately 200 linear meters. Any lack of transfer is noted.

Fixing refers to adhesion of the ink to the substrate. A test image prints block areas of color on the substrate, and adhesion of the ink to the substrate is tested immediately and after 1 hour intervals after printing. Reaching 100% adhesion within 15 minutes is considered good.

Flaking refers to the tendency for the ink to flake off the substrate. This test shows the adhesion and flexibility of the substrate-coating-ink interfaces.

Number of print cleanings refers to the number of sheets needed to remove any residual toner ink left on the blanket or photo imaging plate and get a completely clean image. This is done by printing a number of A4 100% yellow images. Ideally, a low number should be used, showing that 100% ink transfer from the blanket to the substrate is occurring.

Memories refers to a stress test conducted to see if a memory of a previous image is transferred to the next substrate. This is another way of testing to see if the coated substrate provides 100% ink transfer from the blanket.

Transport refers to any web feeding problems which occur during printing.

The results of the tests are shown below in Table 1.

TABLE 1

| Film | Transference | | | Fixing | | | # print cleans needed | Memories | Paper transport | Remarks |
|---|---|---|---|---|---|---|---|---|---|---|
| | Highlight dot | thin lines | high coverage | 15 min. | 60 min. | Flaking | | | | |
| Transparent BOPP | Pass | Pass | Pass | 100% | 100% | None | 1 | None | Pass | Immediate adhesion 100% |
| Opaque BOPP | Pass | Pass | Pass | 100% | 100% | None | 1 | None | Pass | Immediate adhesion 100% |
| Opaque PP | Pass | Pass | Pass | 100% | 100% | None | 1 | None | Pass | Immediate adhesion 85% |
| Glossy Paper | Pass | Pass | Pass | 100% | 100% | None | 1 | None | Pass | Immediate adhesion 85% |

Example 6

Formulation 7 was coated onto transparent and white corona treated BOPP films; corona treated opaque polypropylene film; and glossy paper. The coatings were applied using a Cooper Flexo Reflex Coater fitted with IR dryers. The temperature of the web entering the coating machine was 16° C. and after drying, the temperature of the web on rewind was 32° C. The average dry coating weight was calculated at 0.215 grams per m² for all substrates involved. The adhesion of the primer coating to the substrate was tested immediately off the machine using adhesive tape
in accordance with ISO 2409 and removing the tape after 30 minutes. All of the primer coatings passed.

The coated substrates were then printed on a WS4000 Hewlett-Packard Indigo press fed printer. An uncoated reference film sample of the same BOPP was also printed for comparison purposes.

The print trials tested the following properties: transference, fixing, flaking, print cleaner, memories, and transport. Transference refers to the quality of toner ink transfer to the All of the coated substrates exhibited excellent printability on the HP Indigo WS4000 printer with the exception of the uncoated reference sample, which was found to be unprintable, i.e., no print was transferred to the sample.

Example 7

Formulations 7 and 8 were printed on three different films by direct gravure printing. The films were biaxially oriented polypropylene (BOPP); and polyethylene terephthalate (PET). The coated substrates were printed on an HP Indigo Press WS4000 printer with ElectroInk Mark 4.0 (HP Indigo). Substrate transport was very good. No problems were found with friction, stickiness, or electrostatics. The ink transferability was excellent during the overall test. No fails in ink transfer were found until the blankets reached more than 50,000 separations. The cleaning pages and cleaning monitors indicated that the blankets were free from ink residue or background images for the majority of the test. The blankets were found to be free from printing memories or ghosts up to at least 25,000 separations. The adhesion of the primer and toner ink on the substrate was excellent. Tests were conducted using a peeling test procedure with 3M 610 tape.

While certain representative embodiments and details have been shown for purposes of illustrating the invention, it will be apparent to those persons skilled in the art that various changes in the methods and apparatus disclosed herein may be made without departing from the scope of the invention.

The invention claimed is:

1. A coated polymeric substrate having first and second major surfaces, said substrate being selected from polypropylene, biaxially oriented polypropylene, polyethylene terephthalate, polyamide, biaxially oriented polyamide and polyvinyl chloride, with at least one of said major surfaces having coated thereon a primer coating for enhancing adhesion of liquid toner thereto, said coating comprising a mixture of a copolymer of ethylene and acrylic or methacrylic acid; an adhesion enhancer selected from the group consisting of an aliphatic polyurethane, a hydrogenated hydrocarbon rosin or rosin ester, and an amorphous acrylic polymer; and an anti-blocking agent comprising a metal hydroxide.

2. The coated substrate of claim 1 wherein said at least one major surface of said polymer substrate has been treated by a flame treatment or corona discharge treatment prior to applying said primer coating thereto.

3. The coated substrate of claim 1 wherein said primer coating is about 0.3 to about 2 microns thick.

4. The coated substrate of claim 1 wherein said primer coating is from about 0.5 to about 1 microns thick.

* * * * *

UNITED STATES PATENT AND TRADEMARK OFFICE
CERTIFICATE OF CORRECTION

| | | |
|---|---|---|
| PATENT NO. | : 7,767,294 B2 | Page 1 of 1 |
| APPLICATION NO. | : 12/267629 | |
| DATED | : August 3, 2010 | |
| INVENTOR(S) | : Robin Cooper | |

It is certified that error appears in the above-identified patent and that said Letters Patent is hereby corrected as shown below:

Title Page

(75) "Inventor: Robin Cooper, Belgium (GB)" should read --Inventor: Robin Cooper, Attert (BE)--; and Col No. 1, Line 41 "enhanced" should read --enhance--.

Signed and Sealed this

Twenty-first Day of December, 2010

David J. Kappos
*Director of the United States Patent and Trademark Office*